United States Patent
Duggal et al.

(10) Patent No.: US 12,197,894 B2
(45) Date of Patent: Jan. 14, 2025

(54) SYSTEMS AND METHODS TO GENERATE A COMPONENT FOR A DEVICE APPLICATION

(71) Applicant: Engineer.ai Corp., Salt Lake City, UT (US)

(72) Inventors: Sachin Dev Duggal, Salt Lake City, UT (US); Rohan Patel, London (GB); Priyanka Kochhar, London (GB)

(73) Assignee: Engineer.ai Corp., Salt Lake City, UT (US)

( * ) Notice: Subject to any disclaimer, the term of this patent is extended or adjusted under 35 U.S.C. 154(b) by 25 days.

(21) Appl. No.: 18/182,342

(22) Filed: Mar. 12, 2023

(65) Prior Publication Data

US 2024/0296014 A1    Sep. 5, 2024

Related U.S. Application Data

(60) Provisional application No. 63/488,468, filed on Mar. 3, 2023.

(51) Int. Cl.
*G06F 8/77* (2018.01)
*G06F 8/20* (2018.01)
(Continued)

(52) U.S. Cl.
CPC ...................... *G06F 8/20* (2013.01)

(58) Field of Classification Search
CPC ..... G06F 8/20; G06F 8/71; G06F 8/72; G06F 8/77; G06F 11/3616; G06F 11/3612;
(Continued)

(56) References Cited

U.S. PATENT DOCUMENTS 9,134,999 B2 * 9/2015 Madison .................. G06F 8/30
10,310,968 B2    6/2019 Biddle et al.
(Continued)

FOREIGN PATENT DOCUMENTS

WO    2007106426 A2    9/2007

OTHER PUBLICATIONS

International Search Report and Written Opinion dated Jul. 1, 2024 in International Application No. PCT/US24/18060.
Office Action dated Sep. 23, 2024 in U.S. Appl. No. 18/182,343.

*Primary Examiner* — Thuy Dao
(74) *Attorney, Agent, or Firm* — Kumar Maheshwari; Mahesh Law Group PC

(57) ABSTRACT

Systems and methods for generating a component for a device application are disclosed. The method includes generating a computer-readable specification for a device component, the device component comprising instructions that, when executed, cause a device to perform one or more features and transmitting the computer-readable specification to a set of developers that are determined to be capable of developing the device component. The method includes generating a point cost for each developer in the set of developers to develop the device component and transmitting a task to one or more developers, selected from the set of developers by a user, to develop the device application. The method further includes receiving a completed device component from the one or more developers, the completed device component configured based on the computer-readable specification and allocating points corresponding to the point cost for each developer to each of the one or more developers.

20 Claims, 11 Drawing Sheets

(51) Int. Cl.
  *G06F 8/41* (2018.01)
  *G06F 8/71* (2018.01)
  *G06F 9/445* (2018.01)
  *G06F 9/455* (2018.01)
  *G06Q 10/06* (2023.01)

(58) Field of Classification Search
  CPC .. G06F 21/566; G06F 9/3013; G06F 9/44521;
   G06F 9/451
  See application file for complete search history.

(56) References Cited

U.S. PATENT DOCUMENTS

| | | | |
|---|---|---|---|
| 10,642,611 B2* | 5/2020 | Bhattacharyya | ....... G06Q 10/06 |
| 2002/0156668 A1 | 10/2002 | Morrow et al. | |
| 2014/0067559 A1 | 3/2014 | Tirk et al. | |
| 2015/0169299 A1 | 6/2015 | Sharma et al. | |
| 2018/0267884 A1 | 9/2018 | Dhanda et al. | |
| 2019/0227793 A1 | 7/2019 | Ramasamy | |
| 2019/0243742 A1 | 8/2019 | Natari | |
| 2019/0377571 A1 | 12/2019 | Gupta et al. | |
| 2020/0134564 A1 | 4/2020 | Reilly et al. | |
| 2021/0109750 A1 | 4/2021 | Malde et al. | |
| 2021/0182767 A1 | 6/2021 | Tibrewala et al. | |
| 2021/0224717 A1 | 7/2021 | Hicks et al. | |
| 2022/0004366 A1 | 1/2022 | Ghosh et al. | |
| 2022/0244920 A1 | 8/2022 | Duggal et al. | |
| 2023/0148374 A1 | 5/2023 | Challagolla et al. | |
| 2024/0095027 A1 | 3/2024 | Fanning et al. | |

* cited by examiner

SYSTEMS AND METHODS TO GENERATE A COMPONENT FOR A DEVICE APPLICATION

CROSS REFERENCE TO PRIOR APPLICATION

This application claims the benefit of U.S. Provisional Patent Application No. 63/488,468, entitled "SYSTEMS AND METHODS TO CREATE A DEVICE APPLICATION", filed Mar. 3, 2023, which is incorporated by reference in its entirety.

FIELD OF THE INVENTION

This disclosure relates to software automation, machine learning AI, and project management.

BACKGROUND

Producing a software application often requires expert software coders. The software application may require other types of experts such as designers and quality assurance engineers. The larger the software project, the more personnel or computing resources are needed to complete the software project. Large software projects can easily become unmanageable without proper preparation.

A project manager needs to be on top of how various personnel can each contribute to a single application in a reasonable amount of time. Issues that may come up include but are not limited to the use of new technology, accounting and payment for the various personnel, assuring that various components produced by each of the personnel work seamlessly in the finished software application, and maintaining a clear vision of what the finished product will be while dealing with fine details of managing the software project. There is a need in the art for a better way to manage a software project without being lost in the expense and details that arise during the project.

SUMMARY

The disclosed subject matter relates to managing resources for a software project. In an exemplary embodiment, the techniques described herein relate to a method for generating a software application. The method includes receiving from a user, one or more requirements for the software application and allocating a multitude of points to the user, the points capable of being distributed to one or more developers. The method further includes generating, by a computing system including a processor coupled to a memory, a buildcard based on the one or more requirements, the buildcard comprising a machine readable specification with one or more features for the software application. The method further includes generating, by the computing system, a shell application capable of incorporating one or more software modules and incorporating developed software modules from a subset of the one or more developers into the shell application responsive to a distribution of the points to each of the subset of one or more developers.

Generating the shell application may be automated responsive to receiving the buildcard. The method may further include assigning a value to each of the one or more features, the value including a number of points. The method may further include tasking at least one of the one or more developers to develop a software module, the software module capable of conjoining with the shell application to introduce at least one of the one or more features to the shell application and distributing points to the one or more developers based on the assigned value of the at least one of the one or more features. In some aspects, the techniques described herein relate to a method, wherein generating the buildcard is based on the number of points allocated to the user. The one or more features may be determined based on the number of points allocated to the user. The tasking may be automatically performed using an algorithm that determines a best use of the allocated points to develop the one or more features.

Another general aspect is a computer system to generate of software application. The computer system includes a processor coupled to a memory where the processor is configured to execute a software to receive from a user, one or more requirements for the software application and allocate a multitude of points to the user where the points are capable of being distributed to one or more developers. The software further generates a buildcard based on the one or more requirements where the buildcard includes a machine readable specification with one or more features for the software application. The software further generates a shell application capable of incorporating one or more software modules and incorporates developed software modules from a subset of the one or more developers into the shell application responsive to a distribution of the points to each of the subset of one or more developers. Generating the shell application may be automated responsive to receiving the buildcard. The computer system may further include assigning a value to each of the one or more features, the value including a number of points. The computer system may further include tasking at least one of the one or more developers to develop a software module where the software module is capable of conjoining with the shell application to introduce at least one of the one or more features to the shell application. The software module may be further capable of distributing points to the one or more developers based on the assigned value of the at least one of the one or more features. Generating the buildcard may be based on the number of points allocated to the user. The one or more features may be determined based on the number of points allocated to the user. The task may be automatically performed using an algorithm that determines a best use of the allocated points to develop the one or more features.

An exemplary embodiment is a computer readable storage medium having data stored therein representing software executable by a computer, the software including instructions that, when executed, cause the computer readable storage medium to perform receiving from a user, one or more requirements for the software application and allocating a multitude of points to the user, the points capable of being distributed to one or more developers. The instructions further cause the computer readable storage medium to perform generating a buildcard based on the one or more requirements, the buildcard including a machine readable specification with one or more features for the software application and generating a shell application capable of incorporating one or more software modules. The instructions further cause the computer readable storage medium to perform incorporating developed software modules from a subset of the one or more developers into the shell application responsive to a distribution of the points to each of the subset of one or more developers. Generating the shell application may be automated responsive to receiving the buildcard. The instructions may further cause the computer readable storage medium to perform assigning a value to each of the one or more features, the value including a number of points. The instructions may further cause the computer readable storage medium to perform tasking at least one of the one or more developers to develop a software module, the software module capable of conjoining with the shell application to introduce at least one of the one or more features to the shell application and distributing points to the one or more developers based on the assigned value of the at least one of the one or more features. Generating the buildcard may be based on the number of points allocated to the user. The one or more features may be determined based on the number of points allocated to the user. The tasking may be automatically performed using an algorithm that determines a best use of the allocated points to develop the one or more features.

Another general aspect is a method for generating a component for a device application. The method includes generating a computer-readable specification for a device component, the device component comprising instructions that, when executed, cause a device to perform one or more features and transmitting the computer-readable specification to a set of developers that are determined to be capable of developing the device component. The method includes generating a point cost for each developer in the set of developers to develop the device component and transmitting a task to one or more developers, selected from the set of developers by a user, to develop the device application. The method further includes receiving a completed device component from the one or more developers, the completed device component configured based on the computer-readable specification and allocating points corresponding to the point cost for each developer to each of the one or more developers. The device component may be configured to cause the device to perform the one or more features without dependency from another device component. The point cost for each developer may be received from the developer prior to generating the point cost. The method may further include receiving points, from the user prior to transmitting the task, equal to the point cost for each of the one or more developers selected from the set of developers. The method may further include automatically checking, by a computing system, that the completed device component performs the one or more features. Allocating points may be responsive to the checking. Generating the computer-readable specification may be responsive to receiving the perform one or more features from the user. The method may further include determining that stored device components are not capable of causing the device to perform the one or more features.

An exemplary embodiment is a computer system for generating a component for a device application. The computer system includes a processor coupled to a memory, the processor configured to execute a software to generate a computer-readable specification for a device component, the device component comprising instructions that, when executed, cause a device to perform one or more features and generate a point cost for each developer in the set of developers to develop the device component. The processor is further configured to execute the software to generate a point cost for each developer in the set of developers to develop the device component and transmit a task to one or more developers, selected from the set of developers by a user, to develop the device application. The processor is further configured to execute the software to receive a completed device component from the one or more developers, the completed device component configured based on the computer-readable specification and allocate points corresponding to the point cost for each developer to each of the one or more developers. The device component may be configured to cause the device to perform the one or more features without dependency from another device component. The point cost for each developer may be received from the developer prior to generating the point cost. The processor may be configured to execute the software to receive points, from the user prior to transmitting the task, equal to the point cost for each of the one or more developers selected from the set of developers. The processor may be configured to execute the software to automatically check that the completed device component performs the one or more features. Allocate points may be responsive to the check. Generate the computer-readable specification may be responsive to receiving the perform one or more features from the user where the processor is further configured to execute the software to determine that stored device components are not capable of causing the device to perform the one or more features.

Another general aspect is a computer readable storage medium having data stored therein representing software executable by a computer, the software including instructions that, when executed, cause the computer readable storage medium to perform generating a computer-readable specification for a device component, the device component comprising instructions that, when executed, cause a device to perform one or more features and transmitting the computer-readable specification to a set of developers that are determined to be capable of developing the device component. The instructions further cause the computer readable storage medium to perform generating a point cost for each developer in the set of developers to develop the device component and transmitting a task to one or more developers, selected from the set of developers by a user, to develop the device application. The instructions further cause the computer readable storage medium to perform receiving a completed device component from the one or more developers, the completed device component configured based on the computer-readable specification and allocating points corresponding to the point cost for each developer to each of the one or more developers. The device component may be configured to cause the device to perform the one or more features without dependency from another device component. The point cost for each developer may be received from the developer prior to generating the point cost. The instructions may further cause the computer readable storage medium to perform receiving points, from the user prior to transmitting the task, equal to the point cost for each of the one or more developers selected from the set of developers. The instructions may further cause the computer readable storage medium to perform automatically checking, by a computing system, that the completed device component performs the one or more features where allocating points is responsive to the checking. Generating the computer-readable specification may be responsive to receiving the perform one or more features from the user where the instructions further cause the computer readable storage medium to perform determining that stored device components are not capable of causing the device to perform the one or more features.

An exemplary embodiment is a method for developing a software application. The method includes allocating one or more points to a task, the task comprising the development of a feature for the software application, the feature comprising one or more machine-readable components configured to be tested for quality by a computer system. The method further includes receiving the completed feature, subsequent to the allocating, from one or more developers and verifying that the completed feature meets a set of one or more quality standards. The method further includes distributing one or more resources to the one or more developers responsive to the verifying, the one or more resources proportional to the one or more points. The allocating may be performed responsive to a direction by a user, the direction comprising a selection of one or more developers to develop the feature. The method may be further include determining a set of developers capable of completing the task where the selection is a subset of the set of developers. The method may further include reducing the distribution to the one or more developers responsive to a difference in a time of reception and an estimated time of completion meeting a threshold. The verifying may include comparing the completed feature to a machine-readable build task in a buildcard. The verifying may further include determining that the completed feature causes the software application exhibit the completed feature. The method may further include generating a prototype of the software application that incorporates the completed feature.

Another general aspect is a computer system for developing a software application. The computer system includes a processor coupled to a memory, the processor configured to execute a software to allocate one or more points to a task, the task comprising the development of a feature for the software application, the feature comprising one or more machine-readable components configured to be tested for quality by a computer system. The process is further configured to receive the completed feature, subsequent to the allocating, from one or more developers and verify that the completed feature meets a set of one or more quality standards. The processor is further configured to distribute one or more resources to the one or more developers responsive to the verifying, the one or more resources proportional to the one or more points. The allocating may be performed responsive to a direction by a user, the direction comprising a selection of one or more developers to develop the feature. The processor may be further configured to determine a set of developers capable of completing the task where the selection is a subset of the set of developers. The processor may be further configured to reduce the distribution to the one or more developers responsive to a difference in a time of reception and an estimated time of completion meeting a threshold. Verify may include comparing the completed feature to a machine-readable build task in a buildcard. Verify may further include determining that the completed feature causes the software application exhibit the completed feature. The processor may be further configured to generate a prototype of the software application that incorporates the completed feature.

An exemplary embodiment is a computer readable storage medium having data stored therein representing software executable by a computer, the software comprising instructions that, when executed, cause the computer readable storage medium to perform allocating one or more points to a task, the task comprising the development of a feature for the software application, the feature comprising one or more machine-readable components configured to be tested for quality by a computer system. The instructions further cause the computer readable storage medium to perform receiving the completed feature, subsequent to the allocating, from one or more developers and verifying that the completed feature meets a set of one or more quality standards. The instructions further cause the computer readable storage medium to perform distributing one or more resources to the one or more developers responsive to the verifying, the one or more resources proportional to the one or more points. The allocating may be performed responsive to a direction by a user, the direction comprising a selection of one or more developers to develop the feature. The instructions may further cause the computer readable storage medium to perform determining a set of developers capable of completing the task where the selection is a subset of the set of developers. The instructions may further cause the computer readable storage medium to perform reducing the distribution to the one or more developers responsive to a difference in a time of reception and an estimated time of completion meeting a threshold. The verifying may include comparing the completed feature to a machine-readable build task in a buildcard. The verifying may further include determining that the completed feature causes the software application exhibit the completed feature where the instructions further cause the computer readable storage medium to perform generating a prototype of the software application that incorporates the completed feature.

DETAILED DESCRIPTION

Figure 1:
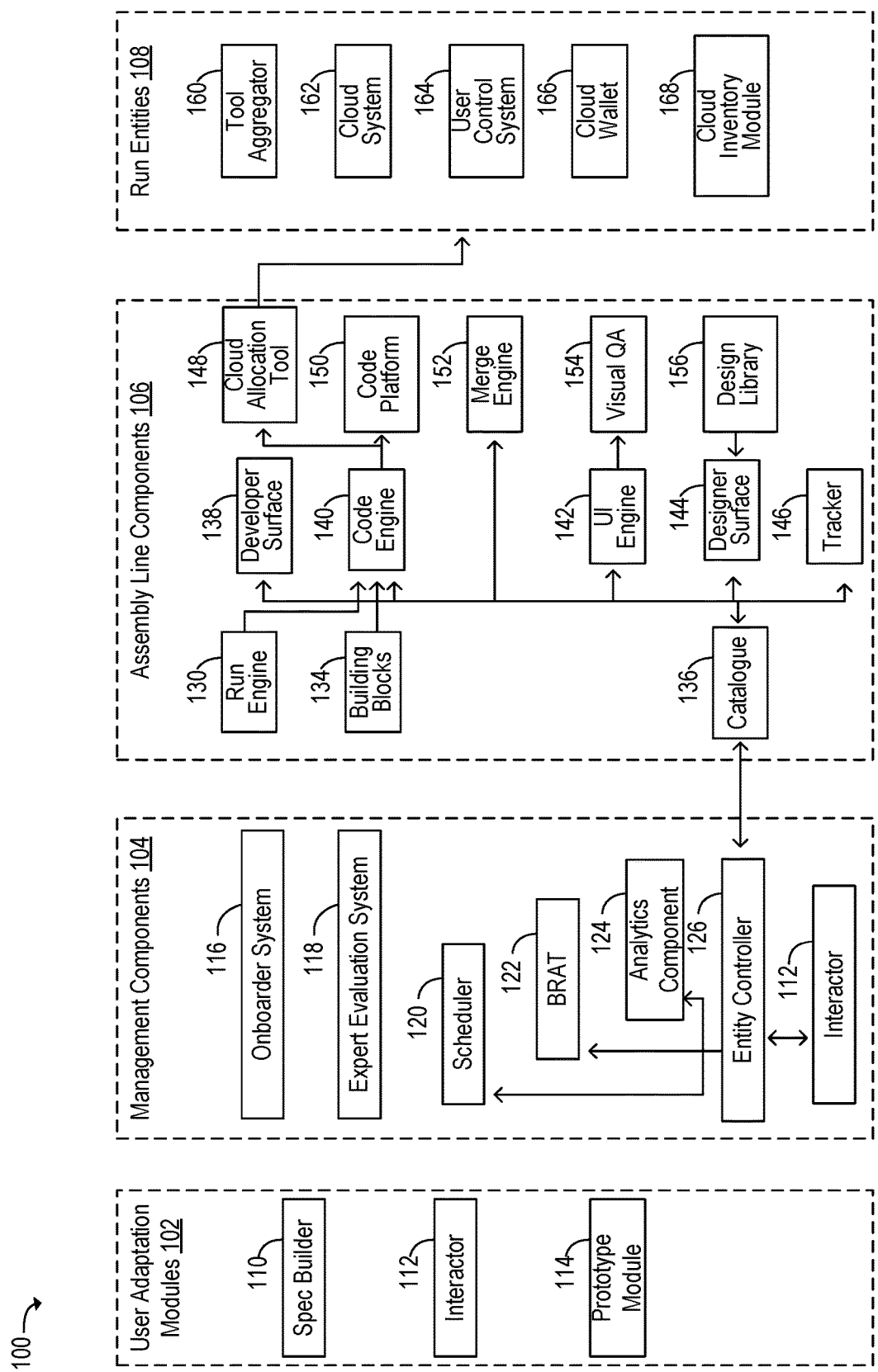
FIG. 1 is a software building system illustrating the components that may be used in an embodiment of the disclosed subject matter.

The disclosed subject matter is a method and system for allocating resources in the development of a software application. In an exemplary embodiment, A user is provided with access to various personnel and the computational resources for software development such as software developers, user interface designers, and quality assurance engineers. However, managing a large software project, even when given access to all of the necessary personnel, can be a challenging task for experienced managers.

Accordingly, the disclosed subject matter reduces many of the challenging aspects of management down to allow a user to focus on the most important aspects of a software project. For example, a user may allocate a variable X1 resources toward the development of a customer database feature, and allocate X2 resources toward the development of a net code feature. The user may further allocate X3 resources toward development of a user interface that works seamlessly with all other features. Going further, the user may allocate X4 resources toward development of designs and the software application. The user may allocate X5 resources to a quality assurance engineer to compile and test the software application.

The disclosed subject matter allocates resources via an allocating unit. The allocating unit may take various forms such as a token or point. In an exemplary embodiment, a user is provided with a limited number of points with which the user may use to allocate resources among various personnel and computing resources. For instance, the user may allocate a set of resources toward development of a back-end database for a software application. If the user feels that certain features are more important or require more effort or development time, the user is free to allocate additional resources toward those features. On the other hand, the user may have the option of allocating fewer resources toward features that the user feels are not as important or do not require as much time and effort to engineer.

In various embodiments, management of the various resources may be delegated away from the user so that the user may focus only on the high-level aspects of the software application. This may aid users who are inexperienced and managing a large project. This may also aid experienced managers who do not have the time to dedicate to managing a large scale and/or complicated project. This may allow fine details such as micro-management decisions, human resources decisions, real estate, local ordinance, state and federal regulation, accounting, and the like to be delegated away from a user.

As such, a user may focus on implementing their vision of a software application without getting bogged down in trivial details that exist for every software application. A user may focus on what makes their software application unique while assigning responsibilities that are common to many software applications to a management service. The management service takes instruction based on the user's point allocation to properly manage resources to develop the software application.

In an example of use of an embodiment of the disclosed subject matter, the management service may distribute points to a user and manage various software development resources based on the user's allocation of those points. the points may be distributed to the user in various ways such as a simple purchase of points, a subscription whereby points are allocated on a subscription basis, a combination thereof, and the like.

Referring to FIG. 1, FIG. 1 is a schematic of a software building system 100 illustrating the components that may be used in an embodiment of the disclosed subject matter. The software building system 100 is an AI-assisted platform that comprises entities, modules, and components that enable the use of state-of-the-art algorithms to support producing custom software.

A user may leverage the various components of the software building system 100 to quickly design and complete a software project. The features of the software building system 100 operate AI algorithms where applicable to streamline the process of building software. Designing, building and managing a software project may all be automated by the AI algorithms.

To begin a software project, an intelligent AI conversational assistant may guide users in conception and design of their idea. Components of the software building system 100 may except plain language specifications from a user and convert them into a computer readable specification that can be implemented by other parts of the software building system 100. Various other entities of the software building system 100 may accept the computer readable specification or buildcard to automatically implement it and/or manage the implementation of the buildcard.

The embodiment of the software building system 100 shown in FIG. 1 includes user adaptation modules 102, management components 104, assembly line components 106, and run entities 108. The user adaptation modules 102 entities guide a user during all parts of a project from the idea conception to full implementation. user adaptation modules 102 may intelligently link a user to various entities of the software building system 100 based on the specific needs of the user.

The user adaptation modules 102 may include Spec Builder 110, Interactor 112, and the prototype module 114. They may be used to guide a user through a process of building software and managing a software project. Spec Builder 110, Interactor 112, and the prototype module 114 may be used concurrently and/or link to one another. For instance, Spec Builder 110 may accept user specifications that are generated in Interactor 112. The prototype module 114 may utilize computer generated specifications that are produced in Spec Builder 110 to create a prototype for various features. Further, Interactor 112 may aid a user in implementing all features in Spec Builder 110 and the prototype module 114.

Spec Builder 110 converts user supplied specifications into specifications that can be automatically read and implemented by various entities of the software building system 100. The machine readable specifications may be referred to herein as a buildcard. In an example of use, Spec Builder 110 may accept a set of features, platforms, etc., as input and generate a machine readable specification for that project. Spec Builder 110 may further use one or more machine learning algorithms to determine a cost and/or timeline for a given set of features. In an example of use, Spec Builder 110 may determine potential conflict points and factors that will significantly affect cost and timeliness of a project based on training data.

Interactor 112 is an AI powered speech and conversational analysis system. It converses with a user with a goal of aiding the user in a specific way. In one example, the Interactor 112 system may ask the user a question to prompt the user to answer about a relevant topic. For instance, the relevant topic may relate to a structure and/or scale of a software project the user wishes to produce. The Interactor 112 system makes use of natural language processing (NLP) to decipher various forms of speech including comprehending words, phrases, and clusters of phases In an exemplary embodiment, the NLP implemented by Interactor 112 is based on a deep learning algorithm. Deep learning is a form of a neural network where nodes are organized into layers. A neural network has a layer of input nodes that accept input data where each of the input nodes are linked to nodes in a next layer. The next layer of nodes after the input layer may be an output layer or a hidden layer. The neural network may have any number of hidden layers that are organized in between the input layer and output layers.

Data propagates through a neural network beginning at a node in the input layer and traversing through synapses to nodes in each of the hidden layers and finally to an output layer. Each synapse passes the data through an activation function such as a Sigmoid function. Further, each synapse has a weight that is determined by training the neural network. A common method of training a neural network is backpropagation.

Various systems and entities of the software building system 100 may be based on a variation of a neural network or similar machine learning algorithm. For instance, input for NLP systems may be the words that are spoken in a sentence. In one example, each word may be assigned to separate input node where the node is selected based on the word order of the sentence. The words may be assigned various numerical values to represent word meaning whereby the numerical values propagate through the layers of the neural network.

The NLP employed by Interactor 112 may output the meaning of words and phrases that are communicated by the user. The Interactor 112 system may then use the NLP output to comprehend conversational phrases and sentences to determine the relevant information related to the user's goals of a software project. Further machine learning algorithms may be employed to determine what kind of project the user wants to build including the goals of the user as well as providing relevant options for the user.

The prototype module 114 can automatically create an interactive prototype for features selected by a user. For instance, a user may select one or more features and view a prototype of the one or more features before developing them. The prototype module 114 may determine feature links to which the user's selection of one or more features would be connected. In various embodiments, a machine learning algorithm may be employed to determine the feature links. The machine learning algorithm may further predict embeddings that may be placed in the user selected features.

An example of the machine learning algorithm may be a gradient boosting model. A gradient boosting model may use successive decision trees to determine feature links. Each decision tree is a machine learning algorithm in itself and includes nodes that are connected via branches that branch based on a condition into two nodes. Input begins at one of the nodes whereby the decision tree propagates the input down a multitude of branches until it reaches an output node. The gradient boosted tree uses multiple decision trees in a series. Each successive tree is trained based on errors of the previous tree and the decision trees are weighted to return best results.

The prototype module 114 may use a secondary machine learning algorithm to select a most likely starting screen for each prototype. Thus, a user may select one or more features and the prototype module 114 may automatically display a prototype of the selected features.

The software building system 100 includes management components 104 that aid the user in managing a complex software building project. The management components 104 allow a user that does not have experience in managing software projects to effectively manage multiple experts in various fields. An embodiment of the management components 104 include the onboarder system 116, an expert evaluation system 118, Scheduler 120, BRAT 122, analytics component 124, entity controller 126, and Interactor 112.

The onboarder system 116 aggregates experts so they can be utilized to execute specifications that are set up in the software building system 100. In an exemplary embodiment, software development experts may register into the onboarder system 116 which will organize experts according to their skills, experience, and past performance. In one example, the onboarder system 116 provides the following features: partner onboarding, expert onboarding, reviewer assessments, expert availability management, and expert task allocation.

An example of partner onboarding may be pairing a user with one or more partners in a project. The onboarder system 116 may prompt potential partners to complete a profile and may set up contracts between the prospective partners. An example of expert onboarding may be a systematic assessment of prospective experts including receiving a profile from the prospective expert, quizzing the prospective expert on their skill and experience, and facilitating courses for the expert to enroll and complete. An example of reviewer assessments may be for the onboarder system 116 to automatically review completed portions of a project. For instance, the onboarder system 116 may analyze submitted code, validate functionality of submitted code, and assess a status of the code repository. An example of expert availability management in the onboarder system 116 is to manage schedules for expert assignments and oversee expert compensation. An example of expert task allocation is to automatically assign jobs to experts that are onboarded in the onboarder system 116. For instance, the onboarder system 116 may determine a best fit to match onboarded experts with project goals and assign appropriate tasks to the determined experts.

The expert evaluation system 118 continuously evaluates developer experts. In an exemplary embodiment, the expert evaluation system 118 rates experts based on completed tasks and assigns scores to the experts. The scores may provide the experts with valuable critique and provide the onboarder system 116 with metrics with it can use to allocate the experts on future tasks.

Scheduler 120 keeps track of overall progress of a project and provides experts with job start and job completion estimates. In a complex project, some expert developers may be required to wait until parts of a project are completed before their tasks can begin. Thus, effective time allocation can improve expert developer management. Scheduler 120 provides up to date estimates to expert developers for job start and completion windows so they can better manage their own time and position them to complete their job on time with high quality.

The Big Resource Allocation Tool (BRAT 122) is capable of generating optimal developer assignments for every available parallel workstream across multiple projects. BRAT 122 allows expert developers to be efficiently managed to minimize cost and time. In an exemplary embodiment, the BRAT 122 system considers a plethora of information including feature complexity, developer expertise, past developer experience, time zone, and project affinity to make assignments to expert developers. BRAT 122 may make use of the expert evaluation system 118 to determine the best experts for various assignments. Further, the expert evaluation system 118 may be leveraged to provide live grading to experts and employ qualitative and quantitative feedback. For instance, experts may be assigned a live score based on the number of jobs completed and the quality of jobs completed.

The analytics component 124 is a dashboard that provides a view of progress in a project. One of many purposes of the analytics component 124 dashboard is to provide a primary form of communication between a user and the project developers. Thus, offline communication, which can be time consuming and stressful, may be reduced. In an exemplary embodiment, the analytics component 124 dashboard may show live progress as a percentage feature along with releases, meetings, account settings, and ticket sections. Through the analytics component 124 dashboard, dependencies may be viewed and resolved by users or developer experts.

The entity controller 126 is a primary hub for entities of the software building system 100. It connects to Scheduler 120, BRAT 122, and the analytics component 124 to provide for continuous management of expert developer schedules, expert developer scoring for completed projects, and communication between expert developers and users. Through the entity controller 126, both expert developers and users may assess a project, make adjustments, and immediately communicate any changes to the rest of the development team.

The entity controller 126 may be linked to Interactor 112, allowing users to interact with a live project via an intelligent AI conversational system. Further, Interactor 112 may provide expert developers with up-to-date management communication such as text, email, ticketing, and even voice communications to inform developers of expected progress and/or review of completed assignments.

The assembly line components 106 comprise underlying components that provide the functionality to the software building system 100. The embodiment of the assembly line components 106 shown in FIG. 1 includes a run engine 130, building blocks 134, catalogue 136, developer surface 138, a code engine 140, a UI engine 142, a designer surface 144, tracker 146, a cloud allocation tool 148, a code platform 150, a merge engine 152, Visual QA 154, and a design library 156.

The run engine 130 may maintain communication between various building blocks within a project as well as outside of the project. In an exemplary embodiment, the run engine 130 may send HTTP/S GET or POST requests from one page to another.

The building blocks 134 are reusable code that are used across multiple buildcards. Buildcards are machine readable specifications that are generated by Spec Builder 110, which may convert user specifications into a buildcard that contains the user specifications and a format that can be implemented by an automated process with minimal intervention by expert developers.

The buildcards are constructed with building blocks 134, which are reusable code components. The building blocks 134 may be pretested code components that are modular and safe to use. In an exemplary embodiment, every building block 134 consists of two sections—core and custom. Core sections comprise the lines of code which represent the main functionality and reusable components across buildcards. The custom sections comprise the snippets of code that define customizations specific to the buildcard. This could include placeholder texts, theme, color, font, error messages, branding information, etc.

Catalogue 136 is a management tool that may be used as a backbone for applications of the software building system 100. In an exemplary embodiment, the catalogue 136 may be linked to the entity controller 126 and provide it with centralized, uniform communication between different services.

Developer surface 138 is a virtual desktop with preinstalled tools for development. Expert developers may connect to developer surface 138 to complete assigned tasks. In an exemplary embodiment, expert developers may connect to developer surface from any device connected to a network that can access the software project. For instance, developer experts may access developer surface 138 from a web browser on any device. Thus, the developer experts may essentially work from anywhere across geographic constraints. In various embodiments, the developer surface uses facial recognition to authenticate the developer expert at all times. In an example of use, all code that is typed by the developer expert is tagged with an authentication that is verified at the time each keystroke is made. Accordingly, if code is copied, the source of the copied code may be quickly determined. The developer surface 138 further provides a secure environment for developer experts to complete their assigned tasks.

The code engine 140 is a portion of a code platform 150 that assembles all the building blocks required by the build card based on the features associated with the build card. The code platform 150 uses language-specific translators (LSTs) to generate code that follows a repeatable template. In various embodiments, the LSTs are pretested to be deployable and human understandable. The LSTs are configured to accept markers that identify the customization portion of a project. Changes may be automatically injected into the portions identified by the markers. Thus, a user may implement custom features while retaining product stability and reusability. In an example of use, new or updated features may be rolled out into an existing assembled project by adding the new or updated features to the marked portions of the LSTs.

In an exemplary embodiment, the LSTs are stateless and work in a scalable Kubernetes Job architecture which allows for limitless scaling that provide the needed throughput based on the volume of builds coming in through a queue system. This stateless architecture may also enable support for multiple languages in a plug & play manner. The cloud allocation tool 148 manages cloud computing that is associate with buildcards. For example, the cloud allocation tool 148 assesses buildcards to predict a cost and resources to complete them. The cloud allocation tool 148 then creates cloud accounts based on the prediction and facilitates payments over the lifecycle of the buildcard.

The merge engine 152 is a tool that is responsible for automatically merging the design code with the functional code. The merge engine 152 consolidates styles and assets in one place allowing experts to easily customize and consume the generated code. The merge engine 152 may handle navigations that connect different screens within an application. It may also handle animations and any other interactions within a page.

The UI engine 142 is a design-to-code product that converts designs into browser ready code. In an exemplary embodiment, the UI engine 142 converts designs such as those made in Sketch into React code. The UI engine may be configured to scale generated UI code to various screen sizes without requiring modifications by developers. In an example of use, a design file may be uploaded by a developer expert to designer surface 144 whereby the UI engine automatically converts the design file into a browser ready format.

Visual QA 154 automates the process of comparing design files with actual generated screens and identifies visual differences between the two. Thus, screens generated by the UI engine 142 may be automatically validated by the Visual QA 154 system. In various embodiments, a pixel to pixel comparison is performed using computer vision to identify discrepancies on the static page layout of the screen based on location, color contrast and geometrical diagnosis of elements on the screen. Differences may be logged as bugs by Scheduler 120 so they can be reviewed by expert developers.

In an exemplary embodiment, Visual QA 154 implements an optical character recognition (OCR) engine to detect and diagnose text position and spacing. Additional routines are then used to remove text elements before applying pixel-based diagnostics. At this latter stage, an approach based on similarity indices for computer vision is employed to check element position, detect missing/spurious objects in the UI and identify incorrect colors. Routines for content masking are also implemented to reduce the number of false positives associated with the presence of dynamic content in the UI such as dynamically changing text and/or images.

The Visual QA 154 system may be used for computer vision, detecting discrepancies between developed screens, and designs using structural similarity indices. It may also be used for excluding dynamic content based on masking and removing text based on optical character recognition whereby text is removed before running pixel-based diagnostics to reduce the structural complexity of the input images.

The designer surface 144 connects designers to a project network to view all of their assigned tasks as well as create or submit customer designs. In various embodiments, buildcards include prompts to insert designs. Based on the buildcard, the designer surface 144 informs designers of designs that are expected of them and provides for easy submission of designs to the buildcard. Submitted designs may be immediately available for further customization by expert developers that are connected to a project network.

Similar to building blocks 134, the design library 156 contains design components that may be reused across multiple buildcards. The design components in the design library 156 may be configured to be inserted into buildcards, which allows designers and expert developers to easily edit them as a starting point for new designs. The design library 156 may be linked to the designer surface 144, thus allowing designers to quickly browse pretested designs for user and/or editing.

Tracker 146 is a task management tool for tracking and managing granular tasks performed by experts in a project network. In an example of use, common tasks are injected into tracker 146 at the beginning of a project. In various embodiments, the common tasks are determined based on prior projects, completed, and tracked in the software building system 100.

The run entities 108 contain entities that all users, partners, expert developers, and designers use to interact within a centralized project network. In an exemplary embodiment, the run entities 108 include tool aggregator 160, cloud system 162, user control system 164, cloud wallet 166, and a cloud inventory module 168. The tool aggregator 160 entity brings together all third-party tools and services required by users to build, run and scale their software project. For instance, it may aggregate software services from payment gateways and licenses such as Office 365. User accounts may be automatically provisioned for needed services without the hassle of integrating them one at a time. In an exemplary embodiment, users of the run entities 108 may choose from various services on demand to be integrated into their application. The run entities 108 may also automatically handle invoicing of the services for the user.

The cloud system 162 is a cloud platform that is capable of running any of the services in a software project. The cloud system 162 may connect any of the entities of the software building system 100 such as the code platform 150, developer surface 138, designer surface 144, catalogue 136, entity controller 126, Spec Builder 110, Interactor 112, and the prototype module 114 to users, expert developers, and designers via a cloud network. In one example, cloud system 162 may connect developer experts to an IDE and design software for designers allowing them to work on a software project from any device.

The user control system 164 is a system requiring the user to have input over every feature of a final product in a software product. With the user control system 164, automation is configured to allow the user to edit and modify any features that are attached to a software project regardless as to the coding and design by developer experts and designer. For example, building blocks 134 are configured to be malleable such that any customizations by expert developers can be undone without breaking the rest of a project. Thus, dependencies are configured so that no one feature locks out or restricts development of other features.

Cloud wallet 166 is a feature that handles transactions between various individuals and/or groups that work on a software project. For instance, payment for work performed by developer experts or designers from a user is facilitated by cloud wallet 166. A user need only set up a single account in cloud wallet 166 whereby cloud wallet handles payments of all transactions.

A cloud allocation tool 148 may automatically predict cloud costs that would be incurred by a buildcard. This is achieved by consuming data from multiple cloud providers and converting it to domain specific language, which allows the cloud allocation tool 148 to predict infrastructure blueprints for customers' buildcards in a cloud agnostic manner. It manages the infrastructure for the entire lifecycle of the buildcard (from development to after care) which includes creation of cloud accounts, in predicted cloud providers, along with setting up CI/CD to facilitate automated deployments.

The cloud inventory module 168 handles storage of assets on the run entities 108. For instance, building blocks 134 and assets of the design library are stored in the cloud inventory entity. Expert developers and designers that are onboarded by onboarder system 116 may have profiles stored in the cloud inventory module 168. Further, the cloud inventory module 168 may store funds that are managed by the cloud wallet 166. The cloud inventory module 168 may store various software packages that are used by users, expert developers, and designers to produce a software product.

Figure 2:
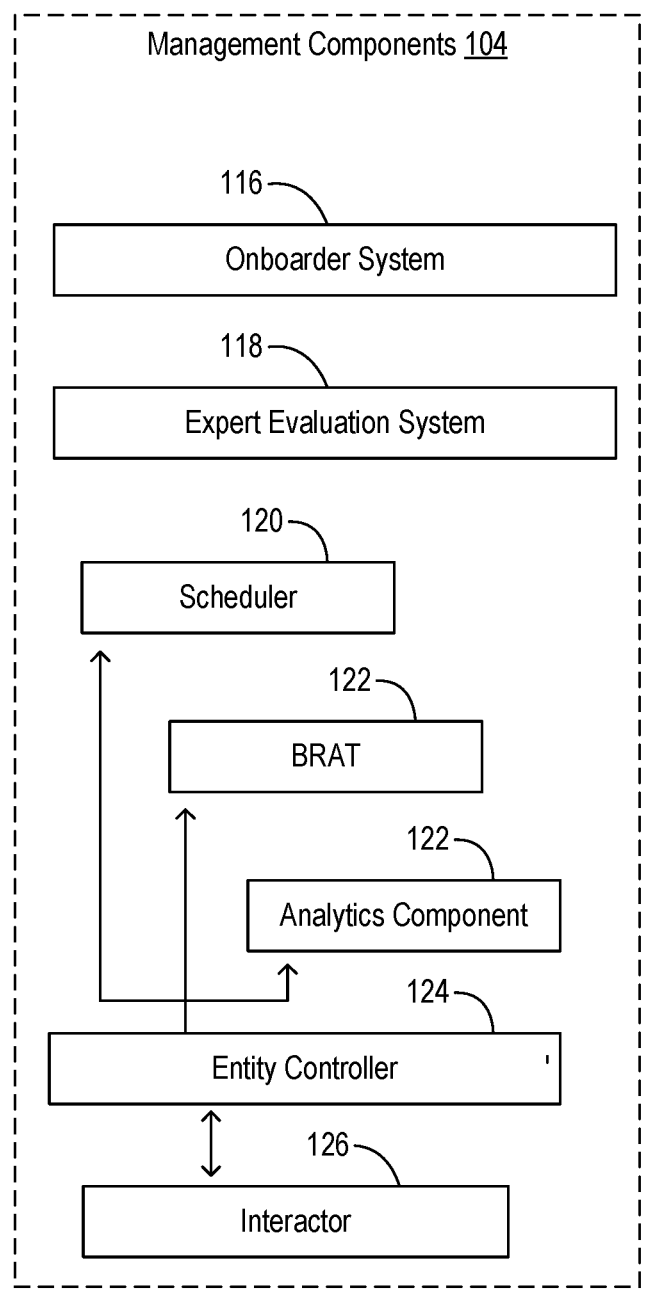
FIG. 2 is a schematic illustrating an embodiment of the management components of the disclosed subject matter.

Referring to FIG. 2, FIG. 2 is a schematic 200 illustrating an embodiment of the management components 104 of the software building system 100. The management components 104 provide for continuous assessment and management of a project through its entities and systems. The central hub of the management components 104 is entity controller 126. In an exemplary embodiment, core functionality of the entity controller 126 system comprises the following: display buildcards configurations, provide statuses of all buildcards, provide toolkits within each buildcard, integration of the entity controller 126 with tracker 146 and the onboarder system 116, integration code repository for repository creation, code infrastructure creation, code management, and expert management, customer management, team management, specification and demonstration call booking and management, and meetings management.

In an exemplary embodiment, the buildcard configuration status includes customer information, requirements, and selections. The statuses of all buildcards may be displayed on the entity controller 126, which provides a concise perspective of the status of a software project. Toolkits provided in each buildcard allow expert developers and designers to chat, email, host meetings, and implement 3rd party integrations with users. Entity controller 126 allows a user to track progress through a variety of features including but not limited to tracker 146, the UI engine 142, and the onboarder system 116. For instance, the entity controller 126 may display the status of buildcards as displayed in tracker 146. Further, the entity controller 126 may display a list of experts available through the onboarder system 116 at a given time as well as ranking experts for various jobs.

The entity controller 126 may also be configured to create code repositories. For example, the entity controller 126 may be configured to automatically create an infrastructure for code and to create a separate code repository for each branch of the infrastructure. Commits to the repository may also be managed by the entity controller 126.

Entity controller 126 may be integrated into Scheduler 120 to determine a timeline for jobs to be completed by developer experts and designers. The BRAT 122 system may be leveraged to score and rank experts for jobs in Scheduler 120. A user may interact with the various entity controller 126 features through the analytics component 124 dashboard. Alternatively, a user may interact with the entity controller 126 features via the interactive conversation in Interactor 112.

Entity controller 126 may facilitate user management such as scheduling meetings with expert developers and designers, documenting new software such as generating an API, and managing dependencies in a software project. Meetings may be scheduled with individual expert developers, designers, and with whole teams or portions of teams.

Machine learning algorithms may be implemented to automate resource allocation in the entity controller 126. In an exemplary embodiment, assignment of resources to groups may be determined by constrained optimization by minimizing total project cost. In various embodiments a health state of a project may be determined via probabilistic Bayesian reasoning whereby a causal impact of different factors on delays using a Bayesian network are estimated.

Figure 3:
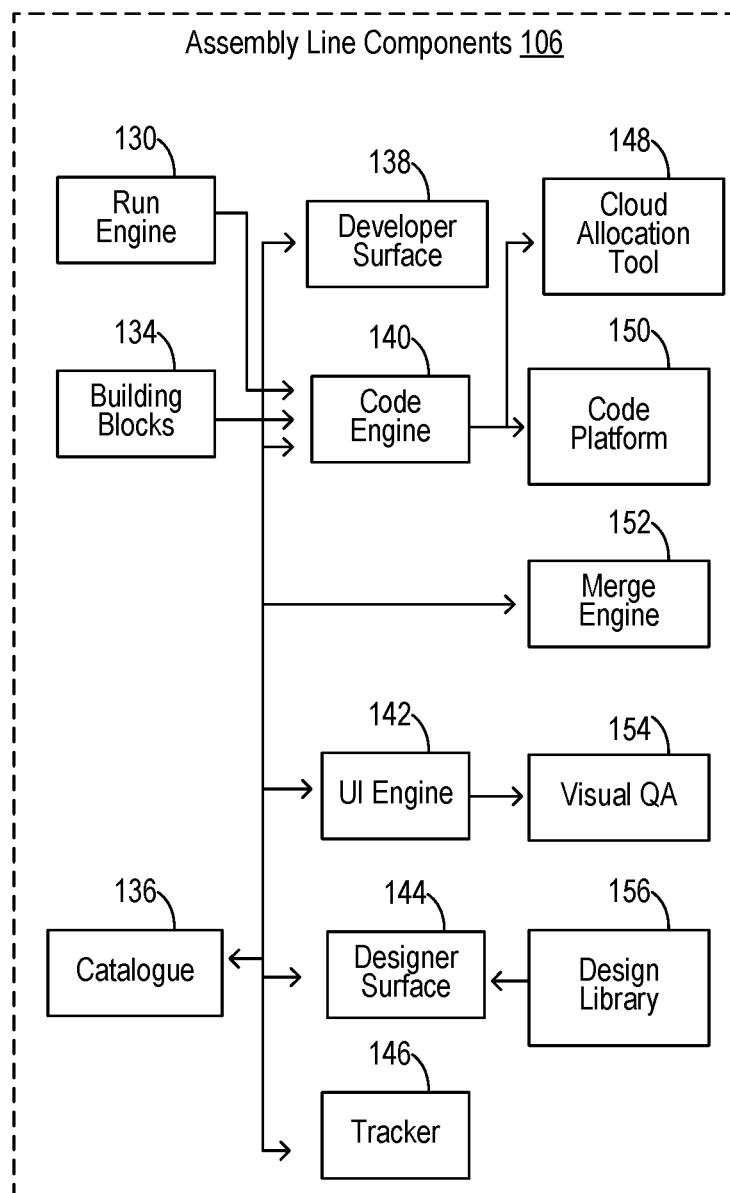
FIG. 3 is a schematic illustrating an embodiment of an assembly line and surfaces of the disclosed subject matter.

Referring to FIG. 3, FIG. 3 is a schematic 300 illustrating an embodiment of the assembly line components 106 of the software building system 100. The assembly line components 106 support the various features of the management components 104. For instance, the code platform 150 is configured to facilitate user management of a software project. The code engine 140 allows users to manage the creation of software by standardizing all code with pretested building blocks. The building blocks contain LSTs that identify the customizable portions of the building blocks 134.

Buildcards may be generated from user specifications. Like the building blocks, the buildcards are designed to be managed by a user without software management experience. The buildcards specify project goals that may be implemented automatically. For instance, the buildcards may specify one or more goals that require expert developers. The Scheduler 120 may hire the expert developers based on the buildcards or with direction from the user. Similarly, one or more designers may be hired based on specifications in a buildcard. Users may actively participate in management or take a passive role.

A cloud allocation tool 148 is used to determine costs for each buildcard. In an exemplary embodiment, a machine learning algorithm is used to assess buildcards to estimate costs of development and design that is specified in a buildcard. Cost data from past projects may be used to train one or more models to predict costs of a project.

The developer surface 138 system provides an easy to set up platform within which expert developers can work on a software project. For instance, a developer in any geography may connect to a project via the cloud system 162 and immediately access tools to generate code. In one example, the expert developer is provided with a preconfigured IDE as they sign into a project from a web browser.

The designer surface 144 provides a centralized platform for designers to view their assignments and submit designs. Design assignments may be specified in buildcards. Thus, designers may be hired and provided with instructions to complete a design by an automated system that reads a buildcard and hires out designers based on the specifications in the buildcard. Designers may have access to pretested design components from a design library 156. The design components, like building blocks, allow the designers to start a design from a standardized design that is already functional.

The UI engine 142 may automatically convert designs into web ready code such as React code that may be viewed by a web browser. To ensure that the conversion process is accurate, the Visual QA 154 system may evaluate screens generated by the UI engine 142 by comparing them with the designs that the screens are based on. In an exemplary embodiment, the Visual QA 154 system does a pixel to pixel comparison and logs any discrepancies to be evaluated by an expert developer.

Figure 4:
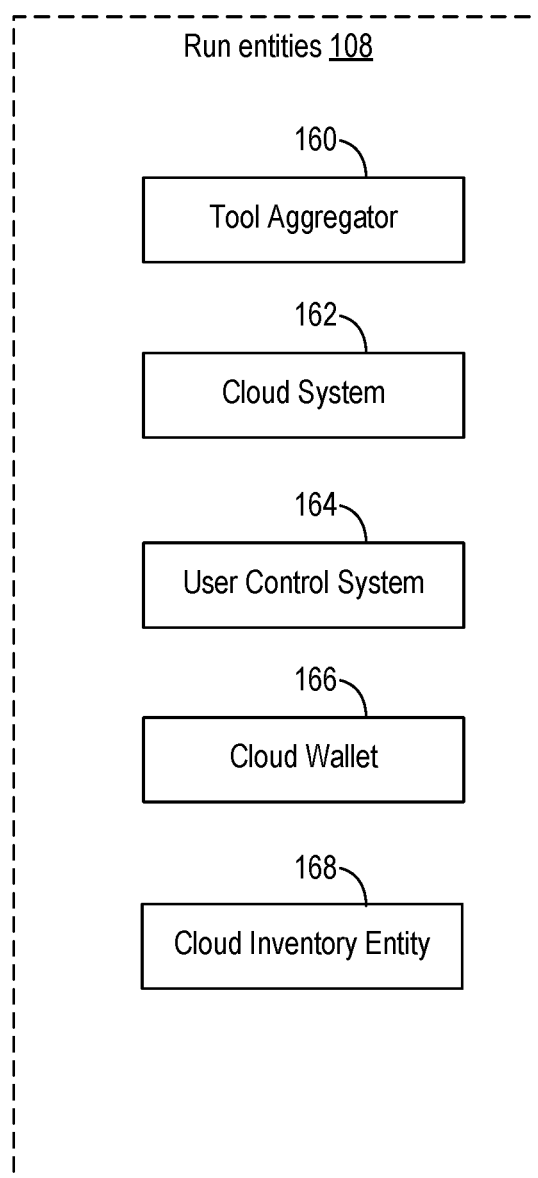
FIG. 4 is a schematic illustrating an embodiment of the run entities of the disclosed subject matter.

Referring to FIG. 4, FIG. 4 is a schematic 400 illustrating an embodiment of the run entities 108 of the software building system. The run entities 108 provides a user with 3rd party tools and services, inventory management, and cloud services in a scalable system that can be automated to manage a software project. In an exemplary embodiment, the run entities 108 is a cloud-based system that provides a user with all tools necessary to run a project in a cloud environment.

For instance, the tool aggregator 160 automatically subscribes with appropriate 3rd party tools and services and makes them available to a user without a time consuming and potentially confusing set up. The cloud system 162 connects a user to any of the features and services of the software project through a remote terminal. Through the cloud system 162, a user may use the user control system 164 to manage all aspects of a software project including conversing with an intelligent AI in Interactor 112, providing user specifications that are converted into buildcards, providing user designs, viewing code, editing code, editing designs, interacting with expert developers and designers, interacting with partners, managing costs, and paying contractors.

A user may handle all costs and payments of a software project through cloud wallet 166. Payments to contractors such as expert developers and designers may be handled through one or more accounts in cloud wallet 166. The automated systems that assess completion of projects such as tracker 146 may automatically determine when jobs are completed and initiate appropriate payment as a result. Thus, accounting through cloud wallet 166 may be at least partially automated. In an exemplary embodiment, payments through cloud wallet 166 are completed by a machine learning AI that assesses job completion and total payment for contractors and/or employees in a software project.

Cloud inventory module 168 automatically manages inventory and purchases without human involvement. For example, cloud inventory module 168 manages storage of data in a repository or data warehouse. In an exemplary embodiment, it uses a modified version of the knapsack algorithm to recommend commitments to data that it stores in the data warehouse. Cloud inventory module 168 further automates and manages cloud reservations such as the tools providing in the tool aggregator 160.

Figure 5:
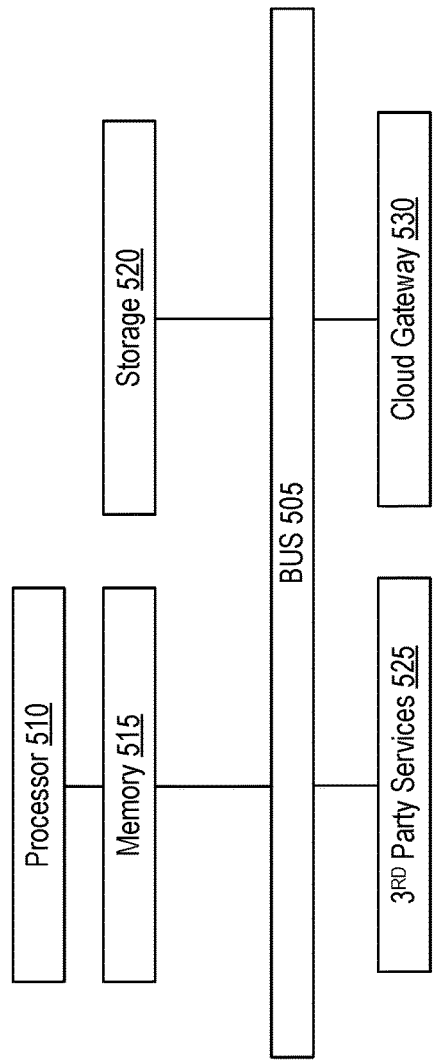
FIG. 5 is a schematic illustrating the computing components that may be used to implement various features of embodiments described in the disclosed subject matter.

Referring to FIG. 5, FIG. 5 is a schematic illustrating a computing system 500 that may be used to implement various features of embodiments described in the disclosed subject matter. The terms components, entities, modules, surface, and platform, when used herein, may refer to one of the many embodiments of a computing system 500. The computing system 500 may be a single computer, a co-located computing system, a cloud-based computing system, or the like. The computing system 500 may be used to carry out the functions of one or more of the features, entities, and/or components of a software project.

The exemplary embodiment of the computing system 500 shown in FIG. 5 includes a bus 505 that connects the various components of the computing system 500, one or more processors 510 connected to a memory 515, and at least one storage 520. The processor 510 is an electronic circuit that executes instructions that are passed to it from the memory 515. Executed instructions are passed back from the processor 510 to the memory 515. The interaction between the processor 510 and memory 515 allow the computing system 500 to perform computations, calculations, and various computing to run software applications.

Examples of the processor 510 include central processing units (CPUs), graphics processing units (GPUs), field programmable gate arrays (FPGAs), complex programmable logic devices (CPLDs), and application specific integrated circuits (ASICs). The memory 515 stores instructions that are to be passed to the processor 510 and receives executed instructions from the processor 510. The memory 515 also passes and receives instructions from all other components of the computing system 500 through the bus 505. For example, a computer monitor may receive images from the memory 515 for display. Examples of memory include random access memory (RAM) and read only memory (ROM). RAM has high speed memory retrieval and does not hold data after power is turned off. ROM is typically slower than RAM and does not lose data when power is turned off.

The storage 520 is intended for long term data storage. Data in the software project such as buildcards, code, designs, and the like may be saved in a storage 520. The storage 520 may be stored at any location including in the cloud. Various types of storage include spinning magnetic drives and solid-state storage drives.

The computing system 500 may connect to other computing systems in the performance of a software project. For instance, the computing system 500 may send and receive data from 3rd party services such as Office 365 and Adobe. Similarly, users may access the computing system 500 via a cloud gateway 530. For instance, a user on a separate computing system may connect to the computing system 500 to access data, interact with the run entities 108, and even use 3rd party services 525 via the cloud gateway.

Figure 6:
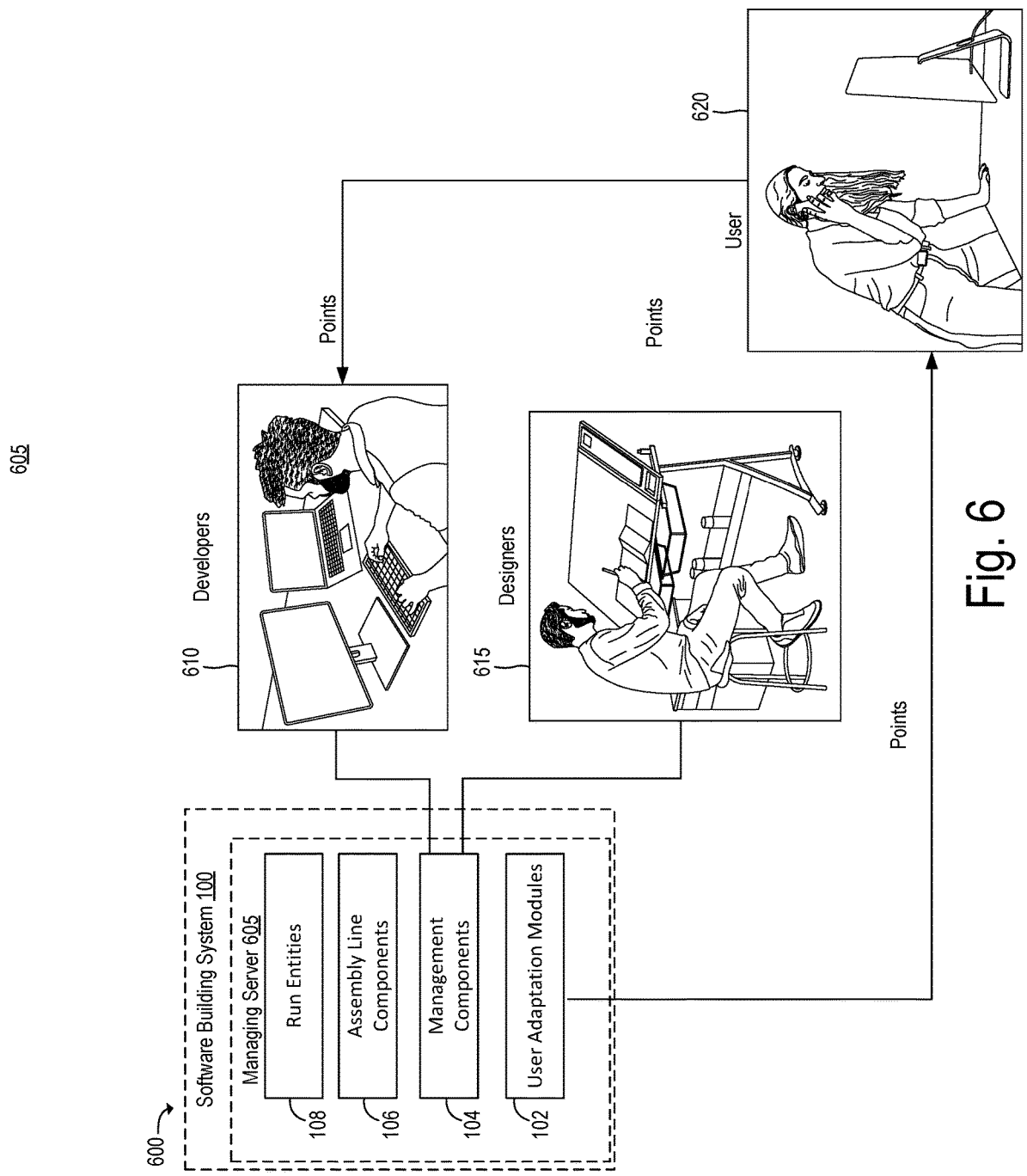
FIG. 6 is a schematic illustrating a resource allocation system in an embodiment of the disclosed subject matter.

Referring to FIG. 6, FIG. 6 is a schematic diagram of a resource allocation system 600 in an embodiment of the disclosed subject matter. In an exemplary embodiment, the resource allocation system 600 comprises the software building system 100, a user 620, developers 610, and designers 615. In the embodiment shown for the resource allocation system 600, the software building system 100 comprises a managing server 605. The managing server 605 may be a computing system 500 that is configured to operate the user adaptation modules 102, the management components 104, the assembly line components 106, and the run entities 108.

In the exemplary embodiment shown in FIG. 6, the managing server 605 is in communication with one or more users 620, one or more developers 610, and one or more designers 615. Various embodiments may include additional personnel or computing resources that produce code, content, or the like for the software application. For example, the managing server 605 may be in communication with one or more quality assurance engineers to assemble, test, and package the software application.

In an exemplary embodiment, the managing server 605 may transfer allocating units to the user 620. The user 620 may distribute the allocating units to various personnel, computing resources, or other services to work on the software application. In an exemplary embodiment, allocating units may be referred to as tokens, points, or the like. As used herein, the allocating units are commonly referred to as points.

In various embodiments, the cloud allocation tool 148 may assess the needs of a software application to determine the amount of points required to complete the software application. For instance, the cloud allocation tool 148 may determine that a software application may require 300 hours of developer time, 115 hours of designer time, and 30 hours of quality assurance time to complete a software application to an accuracy of one standard deviation. The cloud allocation tool 148 may determine multiple amounts of points based on changing variables such as different complexities of the software application, different developers, different designers, and a timeline needed for the completion of the software application project. For instance, a short timeline may require additional resource allocation.

As shown by the flow of points and FIG. 6, the user may distribute points to developers 610 and designers 615. The developers 610, as used herein, may be referred to as experts, developer experts, coders, software engineers, engineers, and the like. In various embodiments, a list of developers 610 may be supplied by an onboarding system 116. In various embodiments, the user 620 contacts and selects their own developers 610.

In an exemplary embodiment, the BRAT 122 may determine an optimal list of developers 610 for a software project. In one implementation, the BRAT 122 may determine multiple optimal lists of developers 610 for the user 620 based on multiple qualities of a software application and/or multiple software application visions. For instance, the BRAT 122 may determine a list of developers for a small-size software application, a medium-sized software application, and a large medium-sized software application. In another instance, the BRAT 122 may determine a list of developers for a consumer-based software application and an industry-based software application where a consumer-based software application has a focus on large volume consumer communication and an industry-based software application has a focus on intimate communication with a small number of industries.

The designers 615, as used herein, may be referred to as artists, web designers, and the like. Various designers 615 may have different skill levels and different skill areas. In an exemplary embodiment, the BRAT 122 may provide a list of designers 615 along with their talent set. A user may use the provided information on designers to allocate resources to designers 615 in a way that promotes the user's 620 vision of the software application.

The resource allocation system 600 allows the user 620 freedom to distribute points according to their vision and limited resources for the software application project. Accordingly, this system maximizes creativity at a high level by allowing the user 620 strategic control over high-level management decisions in the software project. The user 620 is not limited to arbitrary or abstract criteria for selecting developers or designers or how to allocate points to developers or designers. Even where the cloud allocation tool 148 determines a number of points for the user 620, the disclosed resource allocation system 600 provides for the user 620 to distribute those points without limitations.

The distribution of points from a user 620 to developers 610, designers 615, or the like is a signal to the developers 610 and designers 615 to provide an amount of work commensurate with the number of points transferred. The managing server 605 may provide lower management level decisions to the developers 610, designers 615, or other personnel or computing resources based on the points allocated to them by the user 620. In an exemplary embodiment, the managing server 605 may provide payment to the developers 610 and designers 615 based on the points distributed to them.

Figure 7:
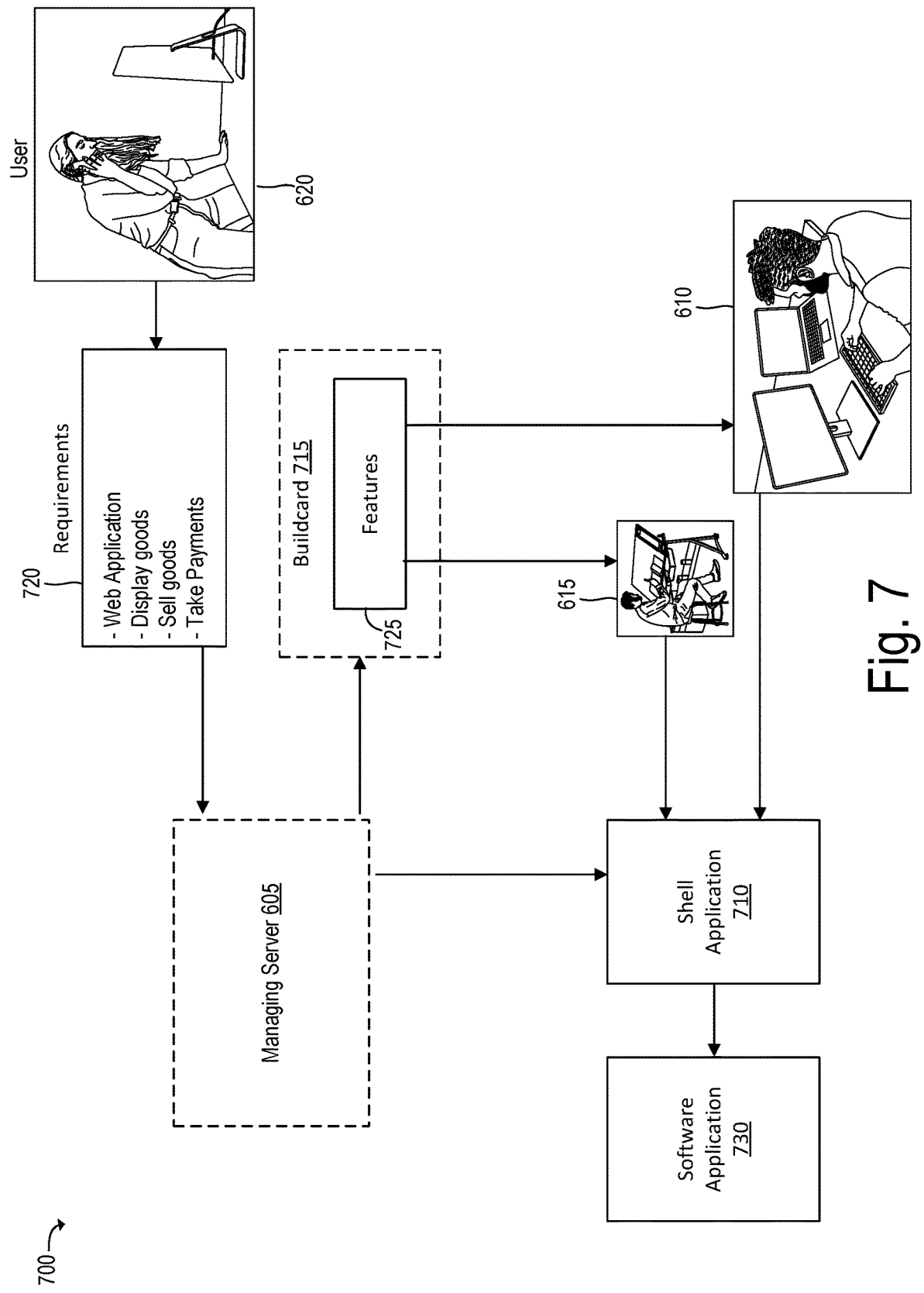
FIG. 7 is a schematic for the production of a software application.

Referring to FIG. 7, FIG. 7 is a schematic 700 for the production of a software application 730. In various embodiments, the software application 730 may be created by adding developed components from developers 610 and designers 615. The managing server 605 may create a shell application 710, which is configured to accept various components, modules, or the like with minimal to no modification to maintain functionality. For instance, the shell application may be generated as a generic application. The generic application is designed to maintain functionality as various elements are added from developers 610 and designers 615.

The shell application 710 may be a single generic application or one of many generic applications. For instance, the managing server may include multiple generic applications depending on requirements 720 that are submitted by the user 620. An example of multiple generic applications may include a generic inventory tracking application, a generic web store application, and a generic internal communication application. The managing server 605 may have any number of generic applications depending on the various needs of customers.

In various embodiments, the shell application 710 may be configured to accept features that are specified by the user 620. For example, if the user 620 indicates a specific use, the shell application 710 may be constructed with shell components that accomplish the specific use. Shell components, as used herein, may be placeholders to receive modules, software modules, components, and the like. In an example, a user 620 may specify that a software application is capable of accepting bids for various products or services. The shell application 710 may then be generated with one or more shell components or shell modules that accomplish the "accepting bids" feature after developers and/or designers 615 submit completed components to the shell application 710.

In an exemplary embodiment, the managing server 605 may prompt a user 620 to submit requirements for a software application. For example, the interactor 112 may converse with the user 620 to determine one or more features that the user 620 requires for the software application. The requirements 720 may take any form such as a list or catalog of features that the user 620 requires. In the example given in the schematic 700, the user 620 may specify that the software application should have the features of being a web application, displaying goods, selling goods, and taking payments.

The interactor 112 may submit the requirements to the managing server whereby the managing server 605 converts the requirements 720 into a machine-readable specification or buildcard 715. The managing server 605 may also generate a shell application with appropriate shell components and/or shell modules that are capable of executing each of the requirements 720 when it becomes a completed software application.

The buildcard 715 may include one or more features 725 that may be developed and included in the shell application 710 to complete the software application 730. For example, the buildcard 715 may include one or more features 725 that describe designs or software functionality that may be completed by a developer 610 or designer 615. For instance, the buildcard 715 may include a feature to track one or more entities via GPS coordinate stream. The feature may describe the requirement to track one or more entities via a GPS coordinate stream to one or more developers 610 so that they may produce a component or module that can be added into the shell application 710.

Figure 8:
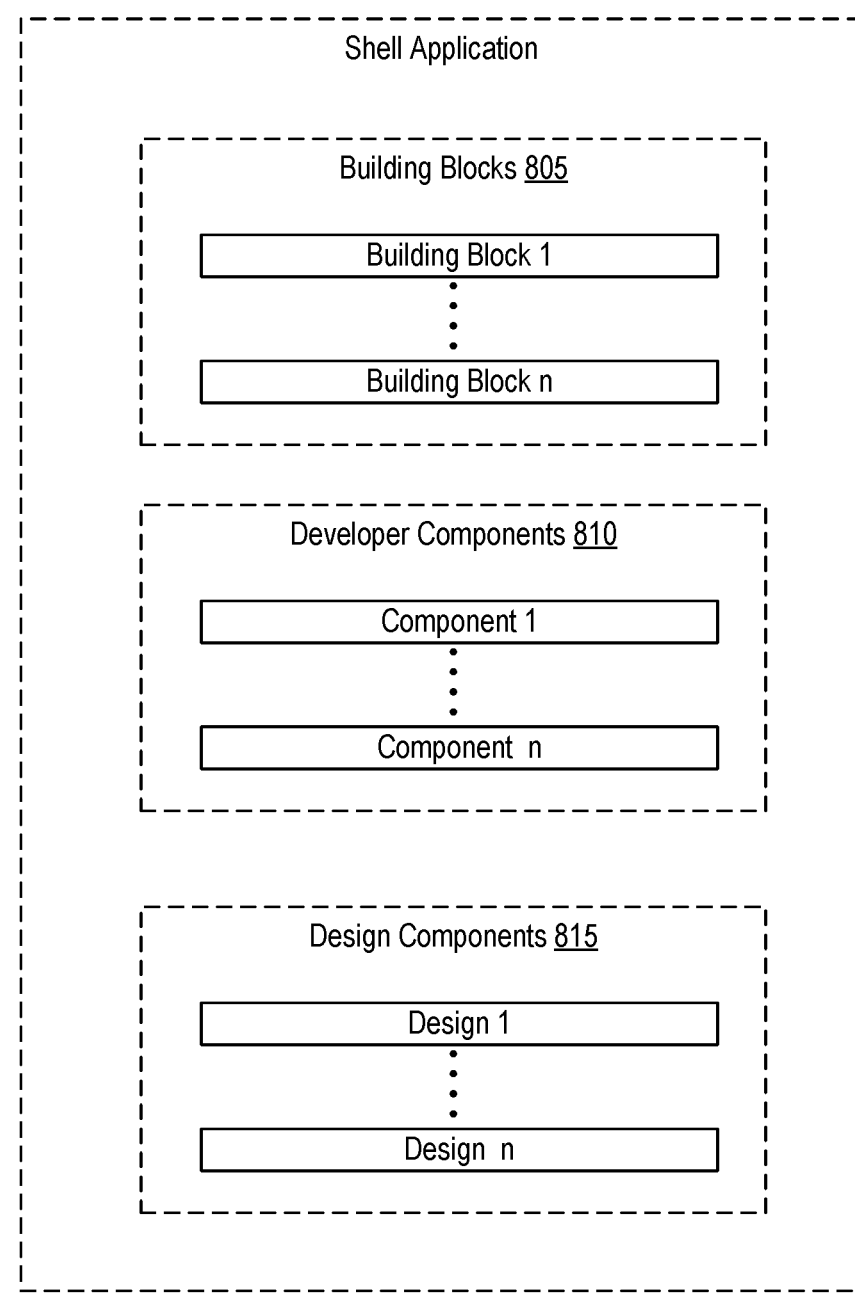
FIG. 8 is an illustration of a shell application 800 in an embodiment of the disclosed subject matter.

Referring to FIG. 8, FIG. 8 is an illustration of a shell application 800 in an embodiment of the disclosed subject matter. The shell application 800 may comprise one or more building blocks 805, developer components 810, and design components 815. The building blocks 805, as described above, are reusable code that may be included and multiple software applications. In an example, a building block 805 may be produced to provide excellent functionality for a component that is applicable to many software applications. For instance, the managing server may include multiple building blocks 805 that may be inserted into a shell application 710 instead of tasking a developer to produce the same code. Accordingly, building blocks 805 may be more rigorously developed and have broader use than custom-developed code for software applications.

In the example of a software application 800 shown in FIG. 8, the shell application 800 may include any number of building blocks 805. In various embodiments, a user 620 may be required to distribute points to the managing server in exchange for each building block. A number of points distributed or allocated for each building block may be determined in various ways. For example, the number of points associated with each building block may be determined based on the relative value of the building block. In another example, the relative points distributed for each building block may be determined based on the amount of resources that were put into developing the building block. And in another example, points associated with each building block are less than points associated with developer components 810 or design components 815 to encourage users 620 make maximal use of building blocks 805.

Like the building blocks 805, the shell application 800 may be configured to accept any number of developer components 810 and design components 815. The shell application 800 may be configured to operate developer components 810 based on features in the buildcard 715. Likewise, the shell application 800 may be configured to operate design components 815 based on features in the buildcard 715. In an exemplary embodiment, the developer components 810 may comprise one or more shell components. The shell components may be placeholders for fully developed components that will be developed by the developers 610.

In an exemplary embodiment, the design components 815 may comprise one or more shell components that are placeholders for fully developed designs. Fully developed designs may be produced by designers 615 to be inserted into the shell application 800.

The user 620 may distribute points to one or more developers 610 and designers 615 to produce functional developer components 810 and design components 815. In various embodiments, the shell application 800 may be configured to accept a variable number of developer components 810 and or design components 815. For instance, the shell application 800 may be configured to operate with between zero to ten developer components 810. Likewise, the shell application may be configured to operate with between a minimum number of design components and a maximum number of design components 815. Accordingly, the user 620 may dictate the number of developer components 810 and design components 815 via allocation of points. Thus, the user 620 has control over which features are produced and inserted into the shell application. The user 620 may have the ultimate determination over which building blocks 805, developer components 810, and design components 815 are developed and inserted into the shell application. Accordingly, the user has high-level control over development of the software application.

Figure 9:
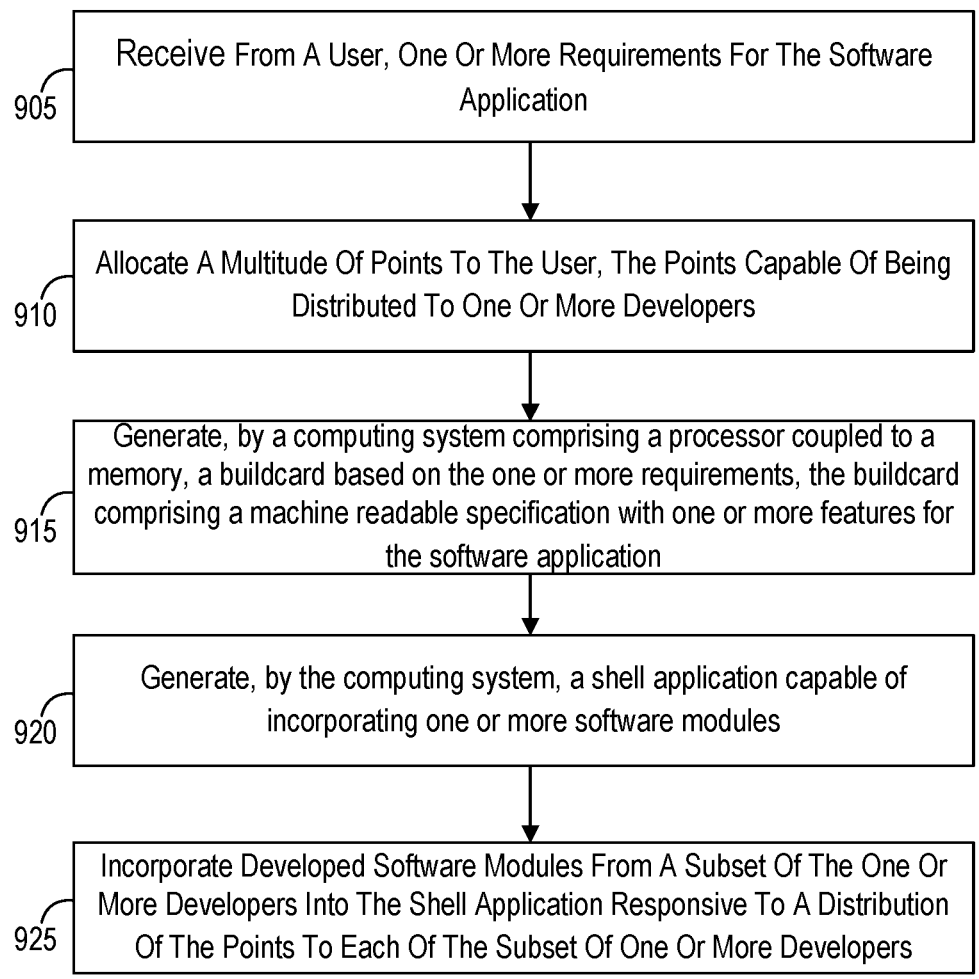
FIG. 9 is a flow diagram of an embodiment of the disclosed subject matter.

Referring to FIG. 9, FIG. 9 is a flow diagram 900 of an embodiment of the disclosed subject matter. The flow diagram 900 illustrates a method of developing a software application. The software application may be any executable process on a computer system comprising instructions, designs, art, user interfaces, audio recordings, music, video, and the like. The software application is not limited to any commercial or consumer application. For example, the software application may be a utility application, a production application, a document generator, a game, and artistic application, and accounting application, or the like.

At step 905 of the process for developing a software application, a system may receive from a user, one or more requirements for the software application. The one or more requirements may be supplied by a user 620 to the computing system. For example, the user 620 may specify that a software application is required to accept audio sound input and catalog it into a database. The computing system may determine that the user 620 specifications require that the software application has at least a feature for recording sounds, a feature for sorting recorded sounds, and a feature for storing distorted sounds in a database.

At step 910, the system may allocate a multitude of points to the user 620, the points capable of being distributed to one or more developers 610. In an exemplary embodiment, the computing system may determine a number of points required by the user using the cloud allocation tool 148. In various embodiments, the cloud allocation tool 148 may determine multiple numbers of points to allocate to the user 620 based on a quality and size of the final software application product desired by the user 620. For example, the computing system may determine that multiple software applications are feasible based on the one or more requirements where each of the multiple software applications requires a different amount of resources to produce.

At step 915, the system may generate, by a computing system comprising a processor coupled to a memory, a buildcard based on the one or more requirements, the buildcard comprising a machine readable specification with one or more features for the software application. The buildcard may specify features that may be read by other computing systems to automate a process or partially automate a process for designing those features. For example, one or more components may read the buildcard and automatically hire one or more developers 610 and hire one or more designers 615 based on the buildcard.

At step 920, the system may generate, by the computing system, a shell application capable of incorporating one or more software modules. The one or more software modules, as used herein, may refer to any product produced by the developers 610. The one or more software modules may be configured to be inserted into a shell application to add functionality to the shell application.

At step 925, the system may incorporate developed software modules from a subset of the one or more developers into the shell application responsive to a distribution of the points to each of the subset of one or more developers. The subset of the one or more developers refers to the feature that the user has the option of selecting and utilizing one or more developers from a larger set of developers. The user distributes points to the selected or subset of developers to develop the software application. In various embodiments, the system only incorporates completed products from developers, designers or other personnel or computing systems into the shell application if points are distributed from the user to them. Accordingly, the user maintains control over the finished product of the software application via the distribution of points.

Figure 10:
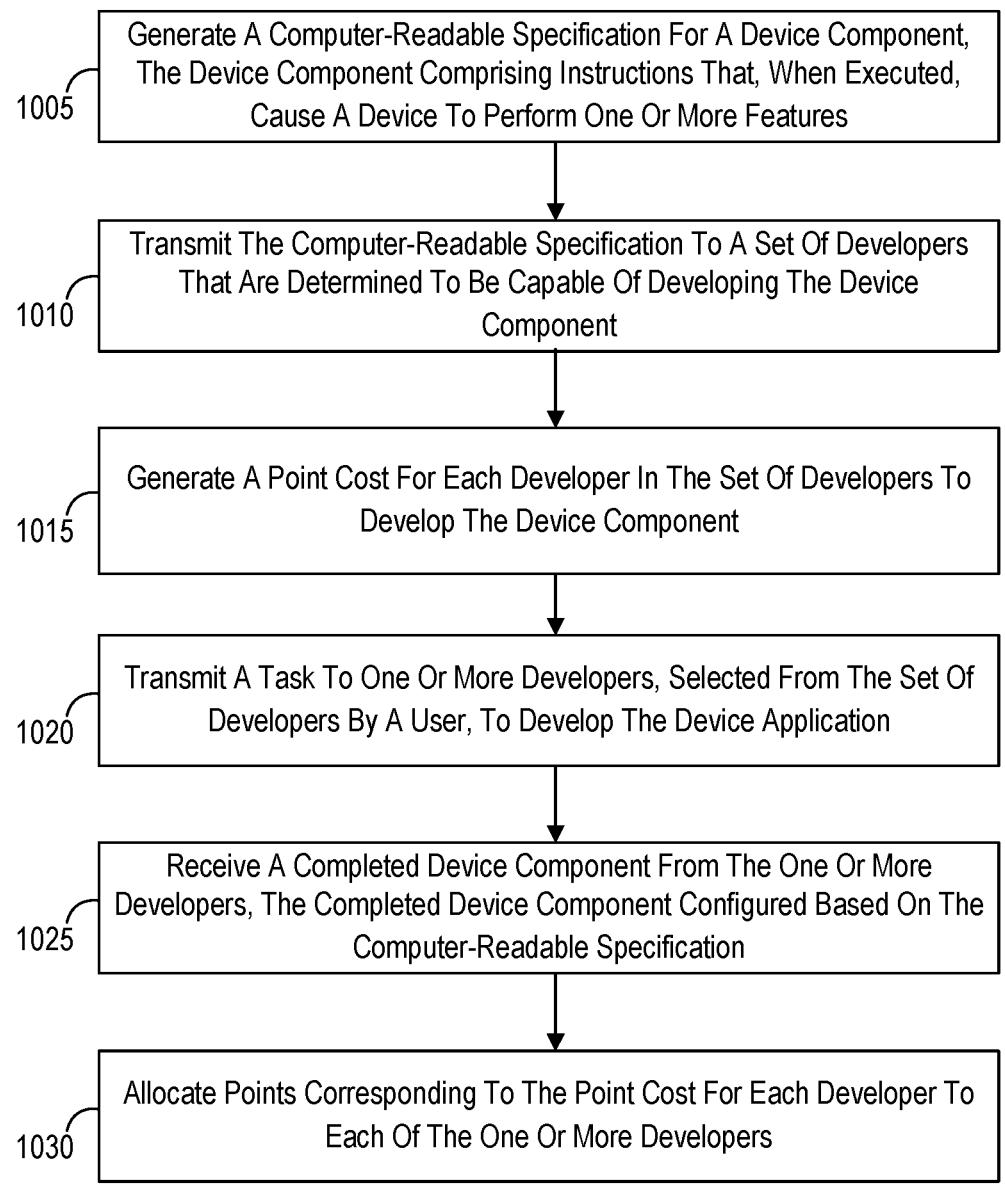
FIG. 10 is a flow diagram of another embodiment of the disclosed subject matter.

Referring to FIG. 10, FIG. 10, is a flow diagram 1000 of another embodiment of the disclosed subject matter. The process of the flow diagram 1000 may be implemented to generate one or more device components for a software application. In an exemplary embodiment, the device component is a building block. In various embodiments, a computing system 500 may be used to implement the process disclosed in the flow diagram 1000. As used herein, the term "system" may refer to hardware or software or a combination thereof that is configured to perform one or more steps of the flow diagram 1000.

At step 1005, the system may generate a computer-readable specification for a device component, the device component comprising instructions that, when executed, cause a device to perform one or more features. The computer-readable specification may be a buildcard or similar set of requirements needed to perform the one or more features. In various embodiments, the system determines one or more requirements needed to perform the one or more features. The system may then generate the computer-readable specification including the one or more requirements. In an exemplary embodiment, the computer readable specification lists one or more functions and the desired output of the one or more functions.

At step 1010, the system may transmit the computer-readable specification to a set of developers that are determined to be capable of developing the device component. Prior to transmitting the computer-readable specification to the set of developers, the system may filter a list of developers based on requirements in the computer-readable specification. For instance, the system may filter the computer-readable specification for developers that are capable of developing a device component that can implement a shopping cart in a relational database. The transmission may be made to the filtered list of developers.

At step 1015, the system may generate a point cost for each developer in the set of developers to develop the device component. The point cost may be proportional to an estimated amount of work that the developer needs to perform to develop the device component. In various embodiments, the point cost is further modified by quality and/or quantity of developer. For example, a developer with a record of developing high quality device components may be paired with a higher point cost than other developers. In another example, a high number of available developers may lower the point cost for each individual developer. In various embodiments, the point cost is received from each developer instead of being determined by the system. For instance, developers may submit a point cost to be received by the system based on their assessment of a value of the device component. In various embodiments, the point cost is an aggregate combination of a determined point cost and a received point cost.

At step 1020, the system may transmit a task to one or more developers, selected from the set of developers by a user, to develop the device application. The task may be an order to develop the device component where the order may be completed through submission of the device component. The user may be a client that is developing a device component. The user may be an individual, a group of individuals, a business entity, or the like. Prior to transmitting the task, the system may receive a list of the one or more selected developers from the user. In various embodiments, the system suggests the one or more developers to the user, allowing the user to easily agree to the suggestion.

At step 1025, the system may receive a completed device component from the one or more developers, the completed device component configured based on the computer-readable specification. The one or more developers may develop the device component subsequent to receiving the task and prior to transmitting the device component to the system.

At step 1030, the system may allocate points corresponding to the point cost for each developer to each of the one or more developers. For example, where the one or more developers comprise a single developer with a generated point cost, the system may allocate points equal to the generated point cost of the single developer. The allocation may work similarly with more than one developer where the total number of points allocated may equal the total number of generated points corresponding to the one or more developers. In various embodiments, the system may check the device component to verify that it functions according to the computer-readable specification prior to allocating the points. In various embodiments, the system may further verify that the device component does not include dependencies to any other device components, such as building blocks, prior to allocating the points.

Figure 11:
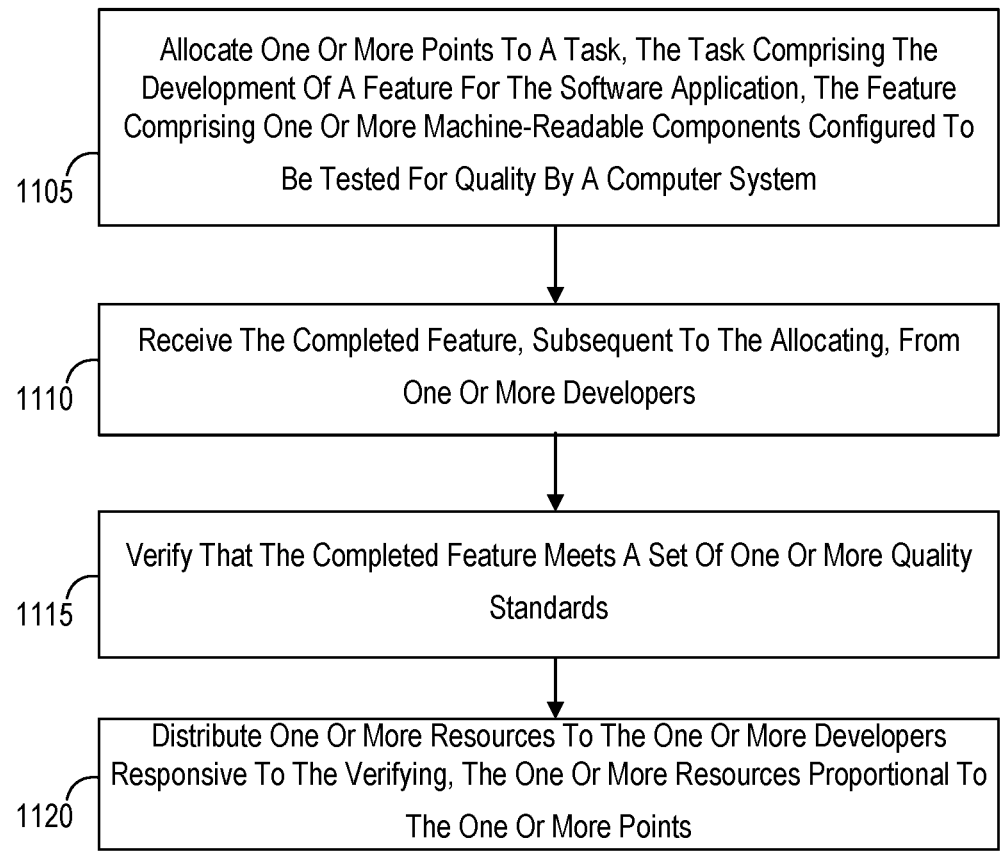
FIG. 11 is a flow diagram of yet another embodiment of the disclosed subject matter.

Referring to FIG. 11, FIG. 11 is a flow diagram 1100 of yet another embodiment of the disclosed subject matter. At step 1105, the system may allocate one or more points to a task, the task comprising the development of a feature for the software application, the feature comprising one or more machine-readable components configured to be tested for quality by a computer system. The test for quality may comprise a test, performed by a computer system, that verifies that the machine-readable components perform the feature. In various embodiments, the task is an order to complete a device component such as a building block for a software application. The allocated points may be assigned to the task such as meta data that is attached to a task. In various embodiments, the allocated points may include instructions to distribute to one or more developers once the task is completed. In various embodiments, the system may store the allocated points until the task is completed. In various embodiments, the allocating is done responsive to a direction from a user. The direction or instruction from the user may comprise a number of points to allocate. The direction may further comprise a selection of one or more developers to perform the task.

In step 1110, the system may receive the completed feature, subsequent to the allocating, from one or more developers. For example, the one or more developers, may complete the task by developing the one or more machine-readable components. Machine-readable components may be building blocks or similar modules, components, classes, functions, or the like. In various embodiments, the one or more developers may submit the completed feature as the one or more machine-readable components.

In step 1115, the system may verify that the completed feature meets a set of one or more quality standards. For example, the system may test the one or more machine-readable components to confirm that they perform the feature. In one example where the feature is to display an image, the system may verify that the one or more machine-readable components display an image. In various embodiments, the verifying may comprise generating a prototype of a software application, that includes the one or more machine-readable components, to confirm that the one or more machine-readable components perform the feature.

In step 1120, the system may distribute one or more resources to the one or more developers responsive to the verifying, the one or more resources proportional to the one or more points. The resources may be any item, unit, token, or the like. The number of resources are directly proportional to the number of points. In an example where there is a 1:1 ratio of points to resources (the resources being tokens) and the system allocated 100 points to a task, the system may distribute 100 tokens to the one or more developers at step 1120. In an example where there is a 10:1 ratio of points to resources (the resources again being tokens) and the system allocated 100 points to a task, the system may distribute 10 tokens to the one or more developers at step 1120. In various embodiments, the distribution may be reduced when the completed feature is received past a date. For example, the distribution may be reduced responsive to a time difference between an estimated completion time and the actual completion time being greater than a threshold. In one instance, the where the threshold is one week and the completion time is 8 days after an estimated completion time, the distribution may be reduced by a percentage such as about 10%. In various embodiments, the distribution may be reduced by a percentage that is directly proportional to the amount of time by which the completion time is late.

Many variations may be made to the embodiments of the software project described herein. All variations, including combinations of variations, are intended to be included within the scope of this disclosure. The description of the embodiments herein can be practiced in many ways. Any terminology used herein should not be construed as restricting the features or aspects of the disclosed subject matter. The scope should instead be construed in accordance with the appended claims.

The invention claimed is:

1. A method for generating a component for a device application, the method comprising:
    generating a computer-readable specification for a device component, the device component comprising instructions that, when executed, cause a device to perform one or more features;
    transmitting the computer-readable specification to a set of developers that are determined to be capable of developing the device component;
    generating a point cost for each developer in the set of developers to develop the device component;
    transmitting a task to one or more developers, selected from the set of developers by a user, to develop the device application;
    receiving a completed device component from the one or more developers, the completed device component configured based on the computer-readable specification; and
    allocating points corresponding to the point cost for each developer to each of the one or more developers.

2. The method of claim 1, wherein the device component is configured to cause the device to perform the one or more features without dependency from another device component.

3. The method of claim 1, wherein the point cost for each developer is received from the developer prior to generating the point cost.

4. The method of claim 1, further comprising receiving points, from the user prior to transmitting the task, equal to the point cost for each of the one or more developers selected from the set of developers.

5. The method of claim 1, further comprising automatically checking, by a computing system, that the completed device component performs the one or more features.

6. The method of claim 5, wherein allocating points is responsive to the checking.

7. The method of claim 1, wherein generating the computer-readable specification is responsive to receiving the perform one or more features from the user; and
further comprising determining that stored device components are not capable of causing the device to perform the one or more features.

8. A computer system for generating a component for a device application, the computer system comprising:
a processor coupled to a memory, the processor configured to execute a software to perform:
generate a computer-readable specification for a device component, the device component comprising instructions that, when executed, cause a device to perform one or more features;
transmit the computer-readable specification to a set of developers that are determined to be capable of developing the device component;
generate a point cost for each developer in the set of developers to develop the device component;
transmit a task to one or more developers, selected from the set of developers by a user, to develop the device application;
receive a completed device component from the one or more developers, the completed device component configured based on the computer-readable specification; and
allocate points corresponding to the point cost for each developer to each of the one or more developers.

9. The computer system of claim 8, wherein the device component is configured to cause the device to perform the one or more features without dependency from another device component.

10. The computer system of claim 8, wherein the point cost for each developer is received from the developer prior to generating the point cost.

11. The computer system of claim 8, wherein the processor is further configured to execute the software to receive points, from the user prior to transmitting the task, equal to the point cost for each of the one or more developers selected from the set of developers.

12. The computer system of claim 8, wherein the processor is further configured to execute the software to automatically check that the completed device component performs the one or more features.

13. The computer system of claim 12, wherein allocate points is responsive to the check.

14. The computer system of claim 8, wherein generate the computer-readable specification is responsive to receiving the perform one or more features from the user; and
wherein the processor is further configured to execute the software to determine that stored device components are not capable of causing the device to perform the one or more features.

15. A computer readable storage medium having data stored therein representing software executable by a computer, the software comprising instructions that, when executed, cause the computer readable storage medium to perform:
generating a computer-readable specification for a device component, the device component comprising instructions that, when executed, cause a device to perform one or more features;
transmitting the computer-readable specification to a set of developers that are determined to be capable of developing the device component;
generating a point cost for each developer in the set of developers to develop the device component;
transmitting a task to one or more developers, selected from the set of developers by a user, to develop a device application;
receiving a completed device component from the one or more developers, the completed device component configured based on the computer-readable specification; and
allocating points corresponding to the point cost for each developer to each of the one or more developers.

16. The computer readable storage medium of claim 15, wherein the device component is configured to cause the device to perform the one or more features without dependency from another device component.

17. The computer readable storage medium of claim 15, wherein the point cost for each developer is received from the developer prior to generating the point cost.

18. The computer readable storage medium of claim 15, wherein the instructions further cause the computer readable storage medium to perform receiving points, from the user prior to transmitting the task, equal to the point cost for each of the one or more developers selected from the set of developers.

19. The computer readable storage medium of claim 15, wherein the instructions further cause the computer readable storage medium to perform automatically checking, by a computing system, that the completed device component performs the one or more features; and
wherein allocating points is responsive to the checking.

20. The computer readable storage medium of claim 15, wherein generating the computer-readable specification is responsive to receiving the perform one or more features from the user; and
wherein the instructions further cause the computer readable storage medium to perform determining that stored device components are not capable of causing the device to perform the one or more features.

* * * * *